US006636938B1

(12) United States Patent
Kim

(10) Patent No.: US 6,636,938 B1
(45) Date of Patent: Oct. 21, 2003

(54) SOUND GENERATOR

(75) Inventor: Yeon Ok Kim, Seoul (KR)

(73) Assignee: Hynix Semiconductor, Inc., Kyoungki-do (KR)

( * ) Notice: Subject to any disclaimer, the term of this patent is extended or adjusted under 35 U.S.C. 154(b) by 0 days.

(21) Appl. No.: 09/132,677

(22) Filed: Aug. 12, 1998

(30) Foreign Application Priority Data

Nov. 13, 1997 (KR) ........................................ 1997-59640

(51) Int. Cl.[7] ................................................ G06F 12/00

(52) U.S. Cl. ........................ 711/105; 711/125; 711/220; 84/604

(58) Field of Search ................................. 711/105, 118, 711/125, 102, 220, 106; 712/34, 35; 84/604, 608, 615, 661

(56) References Cited

U.S. PATENT DOCUMENTS 4,760,521 A * 7/1988 Rehwald et al. ............ 711/106
5,283,387 A 2/1994 Tanaka ........................ 84/604
5,827,987 A * 10/1998 Kosugi ........................ 84/604
5,869,781 A * 2/1999 Kurata ........................ 84/603
5,897,653 A * 4/1999 Tashima ..................... 711/106
6,055,619 A * 4/2000 North et al. .................. 712/36

* cited by examiner

*Primary Examiner*—Do Hyun Yoo
*Assistant Examiner*—B. R. Peugh
(74) *Attorney, Agent, or Firm*—Birch, Stewart, Kolasch & Birch, LLP

(57) ABSTRACT

A sound generator, capable of improving a DRAM download speed and reducing power consumption when operating a DRAM download by applying a dedicated download logic, may increase the download speed up to 8 times at the minimum to 62 times at the maximum, and reduce power consumption by decreasing unnecessary clockings. In addition, since the sound generator according to the present invention does not access a parameter memory when downloading, previously processed data is not erroneously handled, and there is no need to rewrite new data to an internal memory after the download operation is completed.

5 Claims, 5 Drawing Sheets

FRAME
VOICE
1FRAME
2FRAME
nFRAME
0
31

RAS
ADDR
RAS
ADDR

CAS
ADDR
CAS
ADDR

NO
OK
NO
OK
NO
OK
NO

SOUND GENERATOR

BACKGROUND OF THE INVENTION

1. Field of the Invention

The present invention relates to a sound generator, and in particular to an improved sound generator capable of reducing power consumption and improving DRAM download speed by using dedicated DRAM download logic.

2. Description of the Background Art

Nowadays, electronic instruments are pacing a new music field due to their various sound creation capabilities and other functions, in accordance with the rapid development of the computer industry. However, the arrival of the multimedia era requires more effective sound systems for aural satisfaction as well as visual satisfaction. Accordingly, the importance of and demand for more effective sound systems has been increased.

Sound generators are leading components of sound systems, that is, sound generators serve as integrated circuits (ICs) for generating more and better sound.

Currently, as a sound generating method, a frequency modulation (FM) method and pulse code modulation (PCM) are mainly applied to the electronic instruments of analog and digital types.

The FM method obtains a dynamic sound spectrum by using FM in an audio frequency band, and synthesizes natural sounds by similarly reproducing a dynamic spectrum.

The PCM method stores analog waves of the sounds in a memory as a digital sign type after sampling, multiplies the data stored in the memory by an amplitude value, and outputs a resultant value through a D/A converter. The PCM method is carried out simply, and performs as much sampling and storing of sound as possible, if there is enough capacity, thus it is capable of producing sound which is similar to the original sound.

However, most sampling synthesizing methods do not perform sampling of every sound of an instrument, but divides the entire spectrum of sounds into several groups, and samples and stores a representative sound from each group, then obtains the remaining sounds from the representative sound of each group.

FIG. 1 illustrates a conventional sound generator.

As shown therein a CPU interface and clock generating unit 10, which takes charge of a central processing unit (CPU), and an interface, synchronizes a signal received from the CPU with a main clock of the sound generator, and supplies a clock signal necessary for an internal operation by storing instructions of the CPU.

An operation code memory 11 generates an operation code (OC) which is needed for the operation of the sound generator in accordance with an operation signal (OS) outputted from the CPU interface and clock generating unit 10, and a memory controlling unit 12 outputs an address (ADR) of a parameter, necessary for processing each signal, in accordance with the operation code outputted from the operation code memory 11.

A data memory 13 stores the parameter which is needed for processing each signal, such as a filter coefficient, an envelope index number, and algorithm information, etc., and a signal processing unit 14 receives the operation code outputted from the operation code memory 11 and performs a signal processing in accordance with a parameter outputted from the data memory 13.

A signal processing unit 14 generates a desired sound by processing a sampled soundness source received from an external ROM by repetition of adding, subtracting, and multiplying according to an algorithm.

An external memory address generating unit 15 generates an address of an external memory, which stores sound data, in accordance with the operation code outputted from the operation code memory 11.

Now, an operation of the conventional sound generator will be described in detail with reference to the accompanying drawing.

The CPU interface and clock generating unit 10 synchronizes the signal received from the CPU with the main clock of the sound generator, and stores the instruction of the CPU, and supplies a clock signal necessary for the internal operation.

First, when a parameter writing signal WR from the CPU (not shown) is inputted, the CPU interface and clock generating unit 10 controls the memory controlling unit 12 by generating a clock signal (CLK) necessary for the internal operation, thus a parameter needed for processing each signal can be stored in the data memory 13 in accordance with an address outputted from the memory controlling unit 12.

Next, when the operation for storing the parameter is completed, and when an operating signal is outputted from the CPU interface and clock generating unit 10 in accordance with a parameter reading signal RD, the operation code memory 11 generates the operation code necessary for the operation of the sound generator, and repeats an operation of reading/processing a parameter which is needed for signal processing by generating the operation code necessary for the operation of the sound generator.

That is, when the memory controlling unit 12 outputs an address signal of the parameter stored in the data memory 13 in accordance with the operation code outputted from the operation code memory 11, the data memory 13 outputs a parameter which corresponds to the address signal to the signal processing unit 14. The external memory address generating unit 15 accesses the external ROM (not shown) by generating address signals ($\overline{\text{RAS}}$, $\overline{\text{CAS}}$, $\overline{\text{ROMEN}}$, RAMEN, ADDR) in accordance with the operation code outputted from the operation code memory 11.

As a result, the signal processing unit 14 synchronizes the operation code outputted from the operation code memory 11 with an operating signal, and repeatedly performs the addition, subtraction, and multiplication of the sampled sound sources outputted from the external ROM in accordance with the parameter outputted from the data memory 13, for example the algorithm, thereby processing the sampled sound sources received from the external ROM and generating the desired sound. Here, the parameter includes information necessary for processing the signal, such as the filter coefficient, the envelope index number, etc.

In case of downloading sound data retained by a user to a DRAM, the conventional sound generator should repeatedly read a predetermined portion of the operation code memory 11 until all of the sound data is written in the DRAM. Here, an operation code with respect to data writing (instead of sound generation) is written, thus when restarting the sound generation, a new parameter should be rewritten. This is time consuming and complicated.

Accordingly, an interval for reading a predetermined portion of the operation code memory 11 is determined by an interval for generating 1 to 2 voices. In this case, it takes 45 seconds to write data of 4M, so that it is too slow for a user to use.

In addition, the CPU interface and clock generating unit 10 of the conventional sound generator unconditionally outputs data received from the CPU. Therefore, the CPU interface and clock generating unit 10 is not able to check whether the data memory 13 is ready for receiving the data or not, and thus a case of losing the data arises.

Also, the memory continuously generates a clock signal having the same speed as the operation clock of the sound generator although it is in an idle mode, thus resulting in problems, such as unnecessary power consumption and instability of data.

SUMMARY OF THE INVENTION

Accordingly, it is an object of the present invention to provide a sound generator capable of increasing a DRAM download speed and reducing power consumption by using a dedicated DRAM download logic.

To achieve the above objects, there is provided a sound generator which includes a DRAM download control unit for downloading data to a DRAM at high speed in accordance with a DRAM download signal outputted from a central processing unit (CPU).

The DRAM download control unit includes: a signal synchronizing and interface unit for generating a clock signal in accordance with a DRAM download start signal so that a download is enabled at a point in time which 32 voices representing each group are completed; a download signal generating unit for generating a download signal in accordance with a clock signal outputted from the signal synchronizing and interface unit; a refresh signal generating unit for generating a refresh clock signal to prevent downloaded data from being lost when the DRAM download has been completed; a download address and data unit for receiving address and data signals from the signal synchronizing and interface unit and outputting the address and data signals when downloading data; a state display unit for informing the CPU whether it is appropriate to write the data to the DRAM; and a selecting unit for selectively outputting signals, which are outputted from the download signal generating unit, the refresh signal generating unit, and the download address and data unit, in accordance with an external selecting signal.

Additional advantages, objects and features of the invention will become more apparent from the description which follows:

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
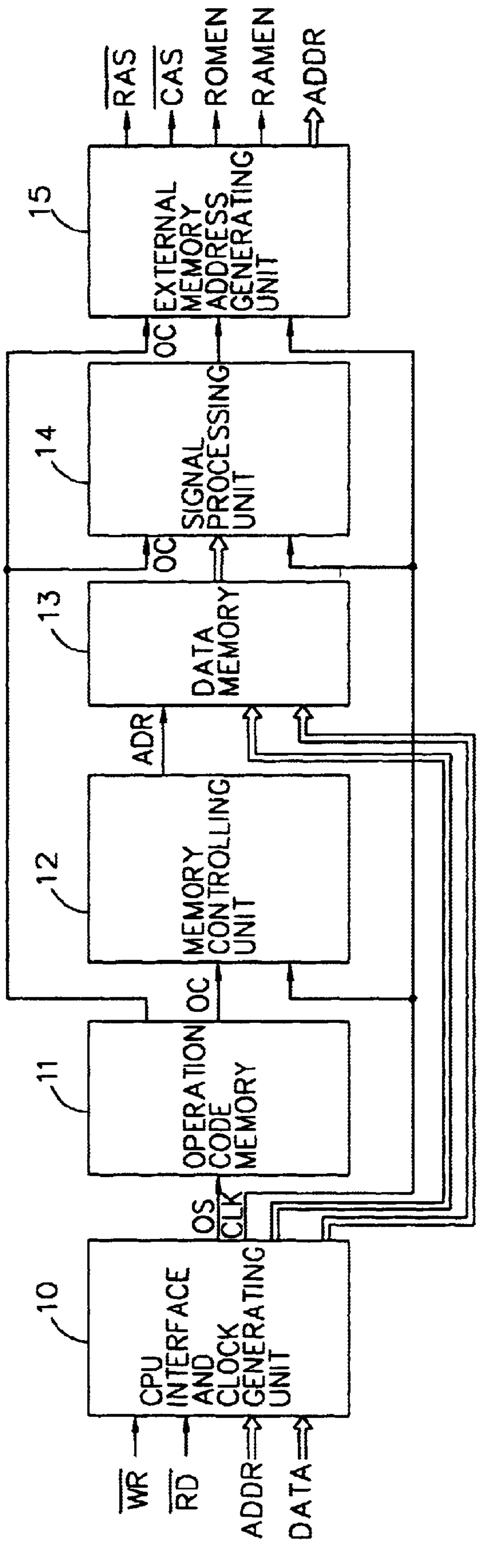
FIG.1 BACKGROUND ART
FIG. 1 is a block diagram of a conventional sound generator.
Figure 2:
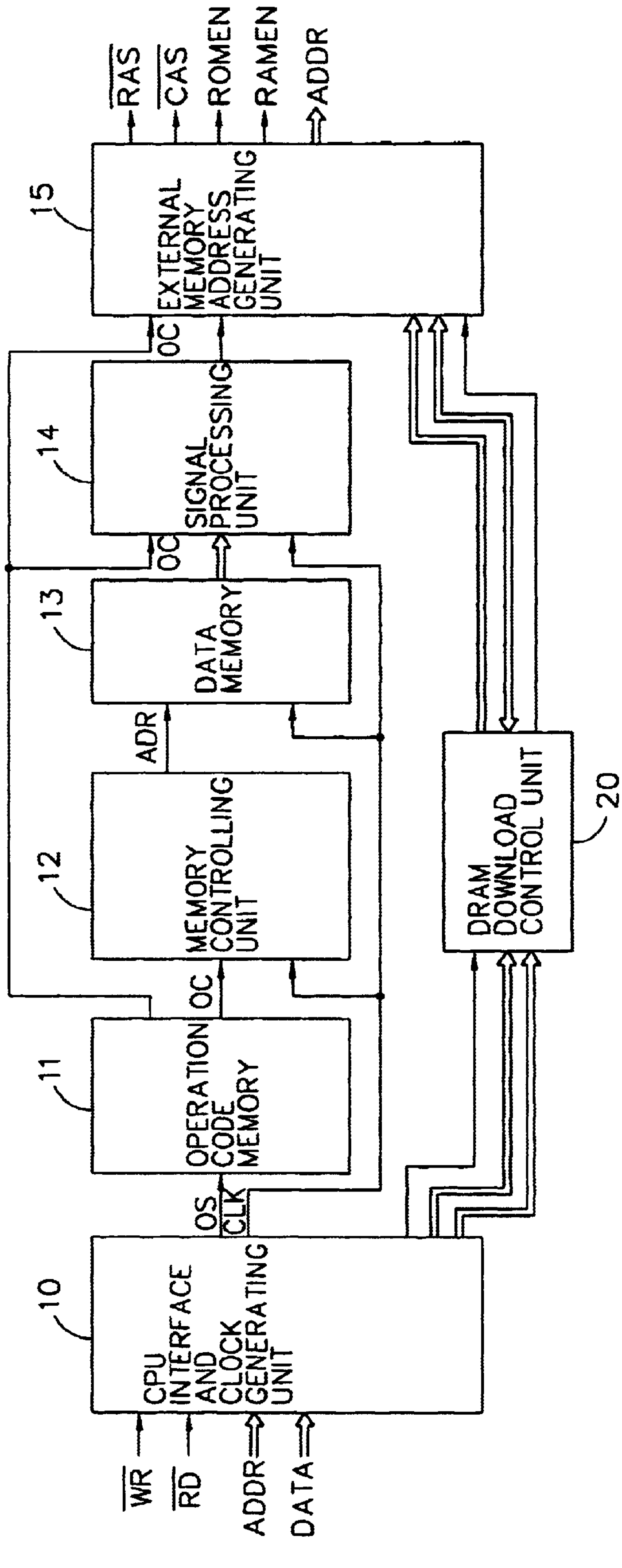
FIG. 2 is a block diagram of a sound generator according to the present invention.
Figure 3:
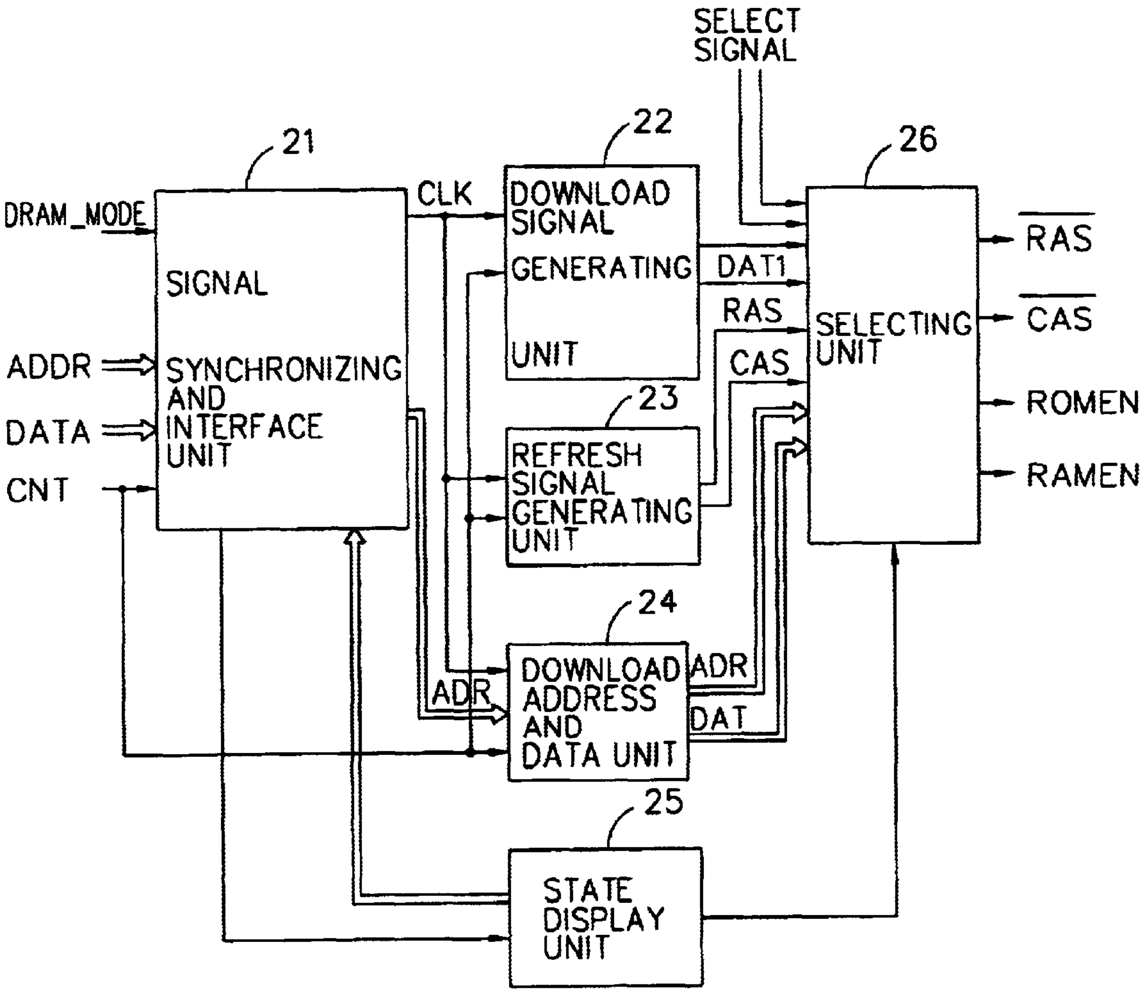
FIG. 3 is a block diagram illustrating a DRAM download control unit in FIG. 2.

FIG. 2 is a block diagram illustrating a sound generator according to the present invention. As shown therein, the sound generator according to the present invention further includes a DRAM download control unit 20, in addition to the conventional sound generator. The DRAM download control unit 20, which downloads data to a DRAM at high speed is illustrated in FIG. 3. Here, the elements which are the same as those of the conventional art are labeled with the same reference numbers.

As shown in FIG. 3, a signal synchronizing and interface unit 21 synchronizes a DRAM download start signal outputted from a CPU, so that a download is enabled at a point in time which 32 voices representing each group are completed, in order to prevent processed data from being erroneously handled.

A download signal generating unit 22 generates a download signal in accordance with a clock signal (CLK) outputted from the signal synchronizing and interface unit 21. A refresh signal generating unit 23 generates refresh clock signals RAS, CAS to prevent downloaded data from being lost when the DRAM download is completed. A download address and data unit 24 receives address (ADR) and data (DAT) signals from the signal synchronizing and interface unit 21 and outputs the address and data signals in case of the download.

A state display unit 25 informs the CPU of a state wherein it is an appropriate time for writing the data to the DRAM. A selecting unit 26 selectively outputs the data (DAT1) and signals, which are outputted from the download signal generating unit 22, the refresh signal generating unit 23 and the download address and data unit 24 in accordance with an external selecting signal and the state signal.

Figure 4:
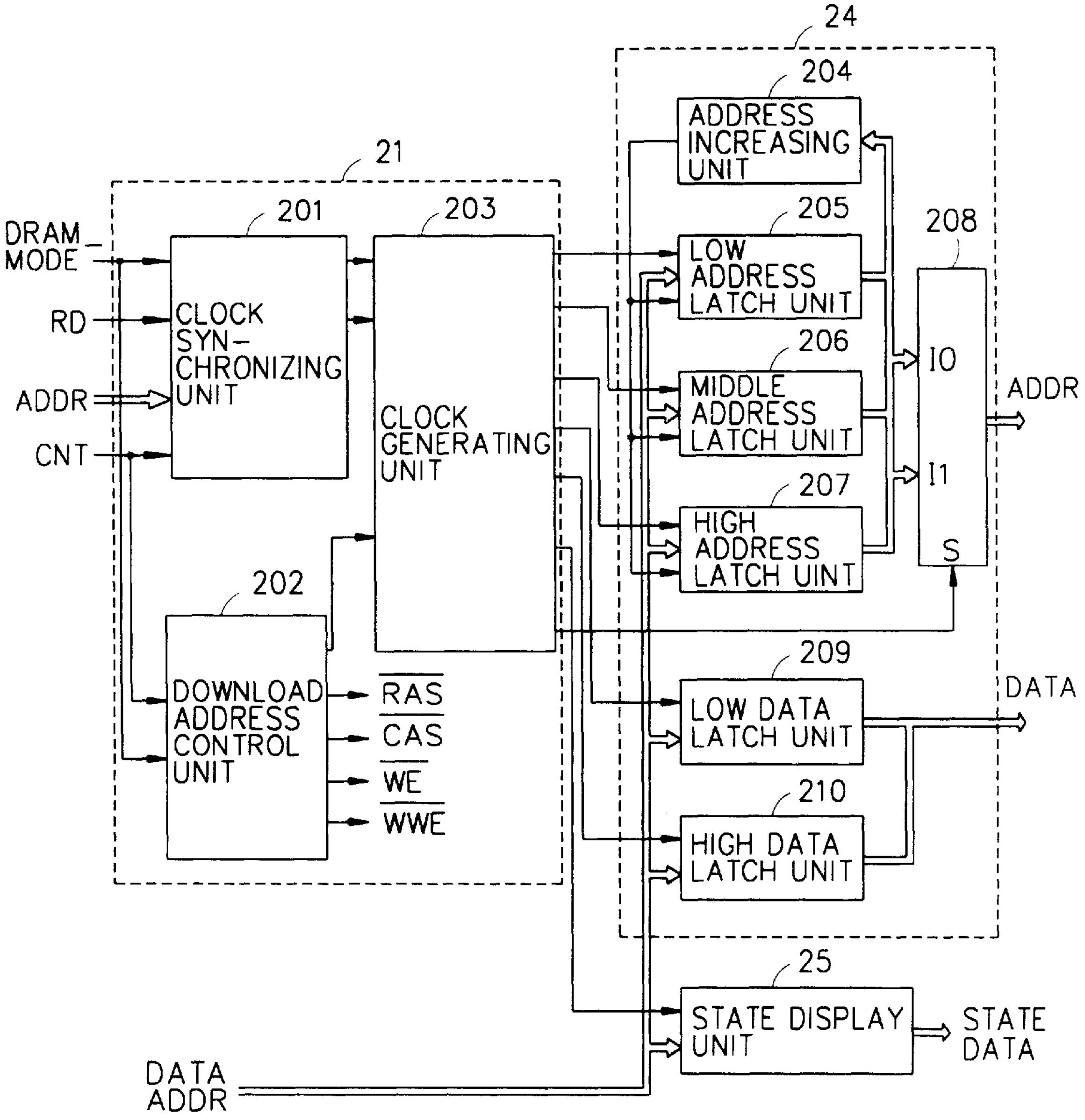
FIG. 4 is a block diagram illustrating a signal synchronizing and interface unit, a download address and data unit, and a state display unit in FIG. 3.

In addition, FIG. 4 is the core of the sound generator according to the present invention, which illustrates the signal synchronizing and interface unit 21, download address and data unit 24, and the state display unit 25 in FIG. 3.

A clock synchronizing unit 201 of the signal synchronizing and interface unit 21 synchronizes signals received from the CPU with the sound generator, and a download address control unit 202 thereof outputs address signals $\overline{RAS}$, $\overline{CAS}$, $\overline{WE}$, $\overline{WWE}$ to the DRAM when the CPU determines that is it in a suitable condition for writing data by checking the state of the sound generator.

The clock generating unit 203 receives a signal outputted from a step counter (not shown) which is in charge of information with respect to 1 frame in the clock synchronizing unit 201, a synchronizing (sync) signal outputted from the clock synchronizing unit 201, and a signal outputted from the down load address control unit 202, and controls data to be loaded in a write enable state. Also, the clock generating unit 203 writes the data to the DRAM and increases an address.

The download address and data unit 24 includes: an address increasing unit 204 for sequentially increasing the address; low, middle, and high address latch units 205, 206, 207 for latching low, middle, and high address signals, respectively, which are received from the CPU in accordance with a clock signal outputted from the clock generating unit 203; a multiplexer 208 for selectively outputting address signals (ADR) outputted from the low, middle, and high address latch units 205, 206, 207 in accordance with a selecting signal outputted from the clock generating unit 203; and low and high data latch units 209, 210 for latching low and high data, respectively, which are outputted from the CPU in accordance with the clock signal outputted from the clock generating unit 203.

An operation of the sound generator according to the present invention will be described with reference to the accompanying drawings.

First, when the CPU sets up a DRAM download mode, the sound generator enters into the DRAM download mode after data processing is completed (that is, after one frame).

Figures 5A, 5B, 5C, 5D, 5E, 5F, 5G, 5H, 5I, 5J, 5K, 5L, 5M, 5N:
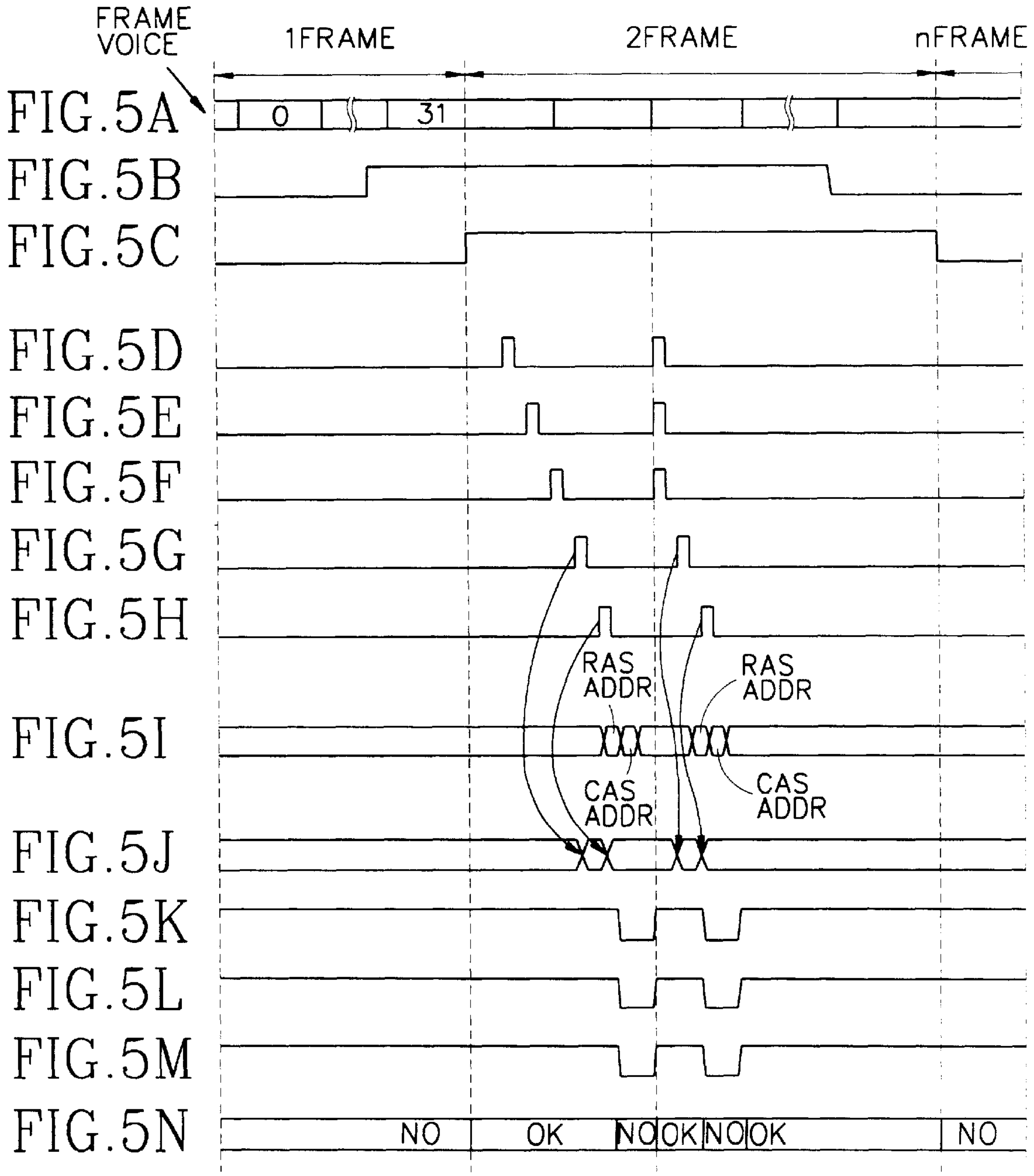
FIGS. 5A to 5N are timing diagrams illustrating each unit in FIG. 4.

The DRAM download is set up while one frame (or 32 slots) of a sound data is being processed (as shown in FIG. 5B), then the clock synchronizing unit 201 of the signal synchronizing and interface unit 21 synchronizes the DRAM download mode at a point in time which a new frame is processed after a previous frame of the sound data has been processed (as shown in FIG. 5C). Here, the step counter (not shown) of the clock synchronizing unit 201 outputs an information signal with respect to one frame.

As shown in FIG. 5N, the state display unit 25 outputs an OK signal indicating that the CPU may write the data, and therefore the CPU acknowledges the signal outputted from the state display unit 25 and starts writing the data.

Here, the download address control unit 202 generates address signals $\overline{RAS}$,$\overline{CAS}$, W$\overline{WE}$ (as shown in FIGS. 5K to 5M) in accordance with a DRAM download mode signal DRAM Mode and a control signal CNT, and the clock generating unit 203 outputs clock signals as shown in FIGS. 5D to 5H to the low, middle, and high address latch units 205,206,207 and the low and high data (LHD) latch units 209,210, respectively.

A data writing sequence of the CPU will now be described.

The CPU generates a data write signal and indicates whether sending data is 1 byte or 2 bytes. An address of the data is latched in the low, middle, and high address latch units 205,206,207 in the order of a low, a middle, and a high address. The latched address is inputted to the DRAM through the multiplexer 208.

When the state display unit 25 of the sound generator sends a signal that the CPU may write the data, the CPU writes the data by latching the data in the low and high data latch units 209,210 in the order of a low and then a high data, and when initial data to be written is 1 byte, the CPU only writes high data.

The data is written in an external DRAM in accordance with the address signals $\overline{RAS}$, $\overline{CAS}$, W$\overline{E}$, W$\overline{WE}$ outputted from the download address control unit 202 and an address outputted from the multiplexer 208. Here, the address increasing unit 204 sequentially increases an address one by one from an initial input address.

Next, after the state display unit 25 sends an OK signal to the CPU that the CPU may write the data as shown in FIG. 5N, the above operation is repeated, thus the data is safely transmitted to the DRAM. The selecting unit 26 selectively outputs the data and signals, which are outputted from the download signal generating unit 22, the refresh signal generating unit 23 and the download address and data unit 24 in accordance with an external selecting signal and the state signal.

As a result, although the conventional sound generator may apply up to 16 bytes for 1 frame, generally the conventional sound generator applied 1–2 bytes therefore. However, the sound generator according to the present invention may apply up to 64 bytes for 1 frame by adding the dedicated DRAM download logic.

As described above, the sound generator according to the present invention may increase the download speed up to 8 times at the minimum to 62 times at the maximum by adding the dedicated DRAM download logic to the conventional sound generator, and reduce power consumption by decreasing clocking.

In addition, since the sound generator according to the present invention does not access a parameter memory when downloading, previously processed data is not erroneously handled, and there is no need to write new data to an internal memory after the download operation is completed, thus preventing time consumption.

Also, the sound generator according to the present invention may write data to a main memory at a high speed without a particular DRAM control when manufacturing the sound generator into a motherboard.

Although the preferred embodiment of the present invention has been disclosed for illustrative purposes, those skilled in the art will appreciate that various modifications, additions and subtractions are possible, without departing from the scope and spirit of the invention, as recited in the accompanying claims.

What is claimed is:

1. A sound generator, comprising:

a CPU interface and clock generating unit connected with a central processing unit (CPU) for synchronizing a signal received from the CPU with a main clock of the sound generator, storing instructions of the CPU, and supplying an internal clock signal;

an operation code memory for generating an operation code which is needed for an operation of the sound generator in accordance with an operation signal outputted from the CPU interface and clock generating unit;

a memory controlling unit for outputting an address of parameters, necessary for each signal processing, in accordance with the operation code outputted from the operation code memory;

a data memory for storing the parameters which are needed for each signal processing, such as a filter coefficient, an envelop index number, and an algorithm information;

a signal processing unit for receiving the operation code outputted from the operation code memory and performing a signal processing in accordance with the parameters outputted from the data memory;

an external memory address generating unit for generating an address of an external memory storing sound data in accordance with the operation code outputted from the operation code memory; and a DRAM download control unit for downloading data to a DRAM at high speed in accordance with a DRAM download signal outputted from the CPU.

2. The sound generator of claim 1, wherein the DRAM download control unit comprises:

a signal synchronizing and interface unit for generating a DRAM download start signal, an address, and a data signal in accordance with a clock signal so that a download is enabled at a point in time at which 32 voices from groups comprising a representative sound, are completed;

a download signal generating unit for generating a download signal in accordance with a clock signal outputted from the signal synchronizing and interface unit;

a refresh signal generating unit for generating a refresh clock signal to prevent downloaded data from being lost when the DRAM download has been completed;

a download address and data unit for receiving address and data from the signal synchronizing and interface unit and outputting the address and data when downloading data;

a state display unit for informing the CPU whether it is appropriate to write the data to the DRAM; and a selecting unit for selectively outputting signals, which are outputted from the download signal generating unit, the refresh signal generating unit, and the download address and data unit, in accordance with an external selecting signal.

3. The sound generator of claim 2, wherein the signal synchronizing and interface unit comprises:

a clock synchronizing unit for synchronizing signals outputted from the CPU with the sound generator;

a download address control unit for outputting address signals to the DRAM when the CPU outputs a signal indicating that it is appropriate for writing data; and a clock generating unit for controlling increase of data and address, so that the data is downloaded to the DRAM in a write enable state, in accordance with an output from a step counter of the clock synchronizing unit, a synchronizing signal outputted from the clock synchronizing unit, and a signal outputted from the download address control unit.

4. The sound generator of claim 2, wherein the download address and data unit comprises:

an address increasing unit for sequentially increasing the address;

low, middle, and high address latch units for latching low, middle, and high addresses, respectively, which are outputted from the CPU, in accordance with a clock signal outputted from the clock generating unit;

a multiplexer for selectively outputting addresses outputted from the low, middle, and high address latch units in accordance with a selecting signal outputted from the clock generating unit; and low and high data latch units for latching low and high data, respectively, which are outputted from the CPU, in accordance with the clock signal outputted from the clock generating unit.

5. The sound generator of claim 2, wherein the state display unit outputs a signal to the CPU, indicating to the CPU that it may write the data to the DRAM.

* * * * *